(12) United States Patent
Kawakami et al.

(10) Patent No.: US 7,663,496 B2
(45) Date of Patent: Feb. 16, 2010

(54) PRESSURE SWITCH

(75) Inventors: Hiroshi Kawakami, Chigasaki (JP); Kazuhiro Kurahara, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 180 days.

(21) Appl. No.: 11/952,097

(22) Filed: Dec. 6, 2007

(65) Prior Publication Data

US 2008/0291035 A1 Nov. 27, 2008

(51) Int. Cl.
*G08B 21/00* (2006.01)

(52) U.S. Cl. .................. 340/626; 340/614; 73/700; 73/719; 200/81 R

(58) Field of Classification Search .................. 340/626, 340/614, 606, 615, 618, 693.5, 693.9; 73/726, 73/720, 756, 719, 725, 734, 153, 700; 338/4, 338/42; 439/686; 200/81 R, 83 R
See application file for complete search history.

(56) References Cited

U.S. PATENT DOCUMENTS

| RE34,893 | E | 4/1995 | Fujii et al. |
| 5,587,535 | A * | 12/1996 | Sasaki et al. ................... 73/726 |
| 6,003,379 | A | 12/1999 | Ichikawa et al. |
| 6,447,342 | B1 * | 9/2002 | Lawlyes et al. ............. 439/686 |
| 6,604,430 | B2 | 8/2003 | Saito et al. |
| 6,869,109 | B2 | 3/2005 | Matsushita |
| 6,997,059 | B2 * | 2/2006 | Ernsberger et al. ............ 73/753 |
| 7,104,136 | B2 | 9/2006 | Akiyama et al. |
| 7,186,934 | B2 | 3/2007 | Nakajima |
| 7,240,558 | B2 * | 7/2007 | Ernsberger et al. ............ 73/719 |
| 7,270,010 | B2 * | 9/2007 | Kaneko et al. ................ 73/753 |
| 2002/0178829 | A1 | 12/2002 | Saito et al. |

FOREIGN PATENT DOCUMENTS

| DE | 3918769 | 12/1989 |
| DE | 19807200 | 8/1999 |
| DE | 10216020 | 10/2002 |
| DE | 10343729 | 5/2004 |
| DE | 102005057774 | 10/2006 |
| EP | 0976961 | 9/2002 |
| JP | 51-101973 | 8/1976 |
| JP | 62-115694 | 7/1987 |
| JP | 07-37473 | 2/1995 |
| JP | 11-030535 | 2/1999 |
| JP | 2001-033336 | 2/2001 |
| JP | 2002-310836 | 10/2002 |
| JP | 2005-345412 | 12/2005 |
| WO | 2006/076745 | 7/2006 |

* cited by examiner

*Primary Examiner*—Toan N Pham
(74) *Attorney, Agent, or Firm*—Paul A. Guss

(57) ABSTRACT

In a pressure switch, a joint coupling holder is mounted via an opening in a case constituting a housing. A plurality of engagement pawls that make up the joint coupling holder engages with a bottom of the case. Further, by inserting a cap into a recess of the joint coupling holder, the engaged state of the engagement pawls is maintained, whereby the housing, which is made from a resin material, and the joint coupling holder are strongly and rigidly connected together.

10 Claims, 6 Drawing Sheets

PRESSURE SWITCH

BACKGROUND OF THE INVENTION

1. Field of the Invention

The present invention relates to a pressure switch, which outputs a detection signal when the pressure value of a pressure fluid, as detected by a detector, matches and agrees with a preset pressure value.

2. Description of the Related Art

Heretofore, transporting a workpiece to a predetermined position has been carried out by supplying a negative pressure fluid to a suction transport means made up, for example, from a suction pad, and while the workpiece is attracted under suction to the suction pad. In this case, in order to confirm whether or not the pressure value of the negative pressure fluid supplied to the suction pad reaches and attains a predetermined pressure, whereby it can be confirmed whether or not the workpiece has been reliably attracted under suction, a pressure switch is employed. Generally speaking, such a pressure switch is equipped with a detector made up from a semiconductor pressure sensor, whereby the pressure of the fluid is detected based on a resistance value that changes in accordance with the pressure imposed on the detector. In addition, in the case that the pressure value detected by the detector agrees with a preset pressure value that is set beforehand, it is judged that the workpiece has been attracted under suction and a detection signal is output.

As disclosed in Japanese Laid-Open Patent Publication No. 7-37473, in this type of pressure switch, a vacuum piping is detachably connected through a pipe coupling, to a pressure intake of a main body in which the detector is accommodated. The negative pressure fluid that flows through the vacuum piping is introduced into the main body, whereby the pressure of the negative pressure fluid is detected.

Incidentally, with the aforementioned conventional pressure switch, a pipe joint that connects a main body portion with vacuum piping is formed of a metal material. The pipe joint, which is formed of a metal material, is connected with respect to the main body portion by means of caulking, crimping or the like. However, with the connection structure of this type of pipe joint, since the configuration of the pipe joint is complex, manufacturing costs as well as the time required to manufacture the pipe joint are increased, and hence productivity is lowered.

Further, since it is often the case that the main body in which the detector is accommodated is formed from a resin material, it is necessary to ensure a predetermined connection strength when the metal material pipe joint is connected. For example, although such strength can be increased by disposing a metal washer between the main body portion and the pipe joint, the assembly steps are increased thereby, and along with increasing the number of parts used, assembly variances tend to occur.

SUMMARY OF THE INVENTION

A general object of the present invention is to provide a pressure switch in which costs can be reduced by utilizing a joint coupling formed of a resin material, and further wherein the joint coupling can easily and securely be connected with respect to a housing.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
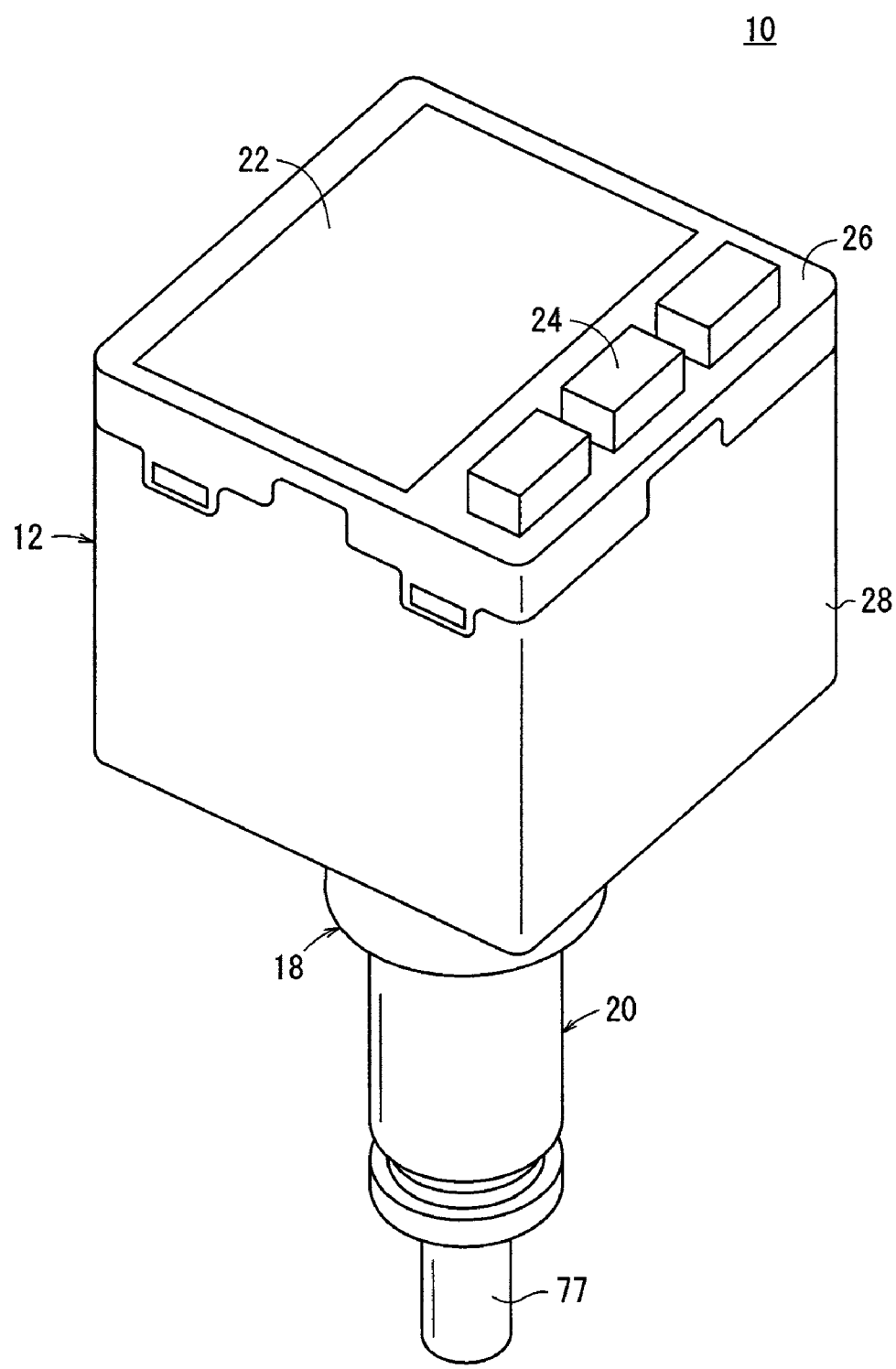
FIG. 1 is an exterior perspective view of a pressure switch according to an embodiment of the present invention.
Figure 2:
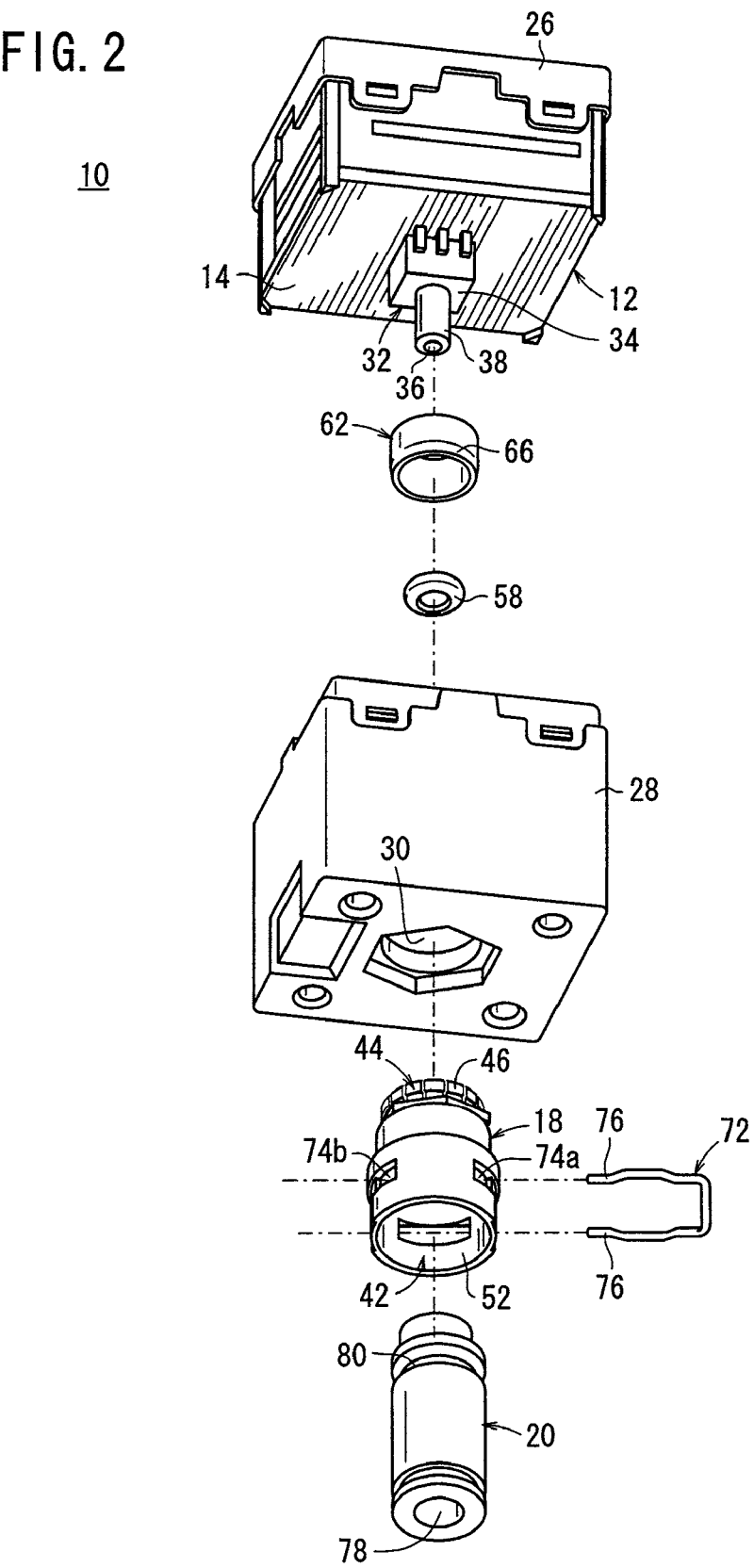
FIG. 2 is an exploded perspective view of the pressure switch shown in FIG. 1.

In FIG. 1, reference numeral 10 indicates a pressure switch in accordance with an embodiment of the present invention.

The pressure switch 10, as shown in FIGS. 1 through 4, includes a housing 12, a control substrate 14 disposed inside the housing 12, a detector 16, which detects the pressure of a pressure fluid (e.g., a negative pressure fluid), disposed on the control substrate 14, a joint coupling holder (connecting member) 18 mounted in an opening 30 of the housing 12, and a joint coupling 20, which is connected to the joint coupling holder 18, and through which a fluid flows.

As shown in FIG. 1, the housing 12 is constituted by a plate shaped cover 26, on which a display 22 and operating buttons 24 are provided, and a bottomed box shaped case 28 to which the cover 26 is joined and inside of which the control substrate 14 is accommodated. An opening of the case 28 is closed by mounting the cover 26 thereon, in a state in which the control substrate 14 and the detector 16 are accommodated therein, whereby the case 28 is hermetically closed and sealed.

Further, an opening 30 is formed substantially centrally in the bottom (side surface) 28a of the case 28 (see FIGS. 3 and 4), and the joint coupling holder 18 is installed and mounted in the opening 30.

The control substrate 14 is fixed inside the case 28, substantially in parallel with the bottom 28a of the case 28. The control substrate 14 is connected electrically to the display 22 and the operating buttons 24. The display 22 is capable of displaying, for example, the pressure value of the pressure fluid, which is detected by the detector 16. The operating buttons 24 are provided, for example, in order to carry out operations for setting various modes of operation.

The detector 16 is mounted on a side surface of the control substrate 14 facing the opening 30 of the case 28, and is connected electrically with respect to the control substrate 14. The detector 16, for example, is constituted from a semiconductor pressure sensor, and is capable of detecting pressure based on a resistance value, which changes by means of the pressure of the pressure fluid that is imposed on the detector 16.

A sensor holder 32 is substantially T-shaped in cross section, and is constituted by a base member 34 formed on one end thereof, which is installed so as to surround the detector 16 with respect to the control substrate 14, and a cylindrical member 38 projecting from the base member 34 and having a passage 36 defined therein through which the pressure fluid flows.

A space 40 is provided on an inner portion of the base member 34, inside of which the detector 16 is accommodated. The space 40 communicates with the passage 36 of the cylindrical member 38. The cylindrical member 38 is disposed substantially in the center of the base member 34 and is formed along a straight line, having a given height in a direction separating away from the control substrate 14, such that the passage 36 is formed along the axis thereof. More specifically, the passage 36 is arranged so as to face towards the detector 16, which is disposed inside the space 40.

The joint coupling holder 18 is formed in a cylindrical shape having a through hole (passage) 42 substantially in a center portion thereof along the axial direction. One end of the joint coupling holder 18 is insertable into the opening 30 of the housing 12, and a plurality of engagement pawls (pawls) 44, which are compressible in a radial direction, are disposed on an outer circumferential side of the through hole 42. The engagement pawls 44 are arranged circumferentially along the joint coupling holder 18 separated by equal intervals, and include expanded portions 46 thereon, which project in a radially outward direction on ends of the engagement pawls 44. Specifically, the ends of the engagement pawls 44 having the expanded portions 46 are provided so as to be capable of tilting or being bent radially inward.

Further, the outer peripheral surface 44a of the engagement pawls 44 is formed in a tapered shape, which gradually expands in diameter from the other end side of the joint coupling holder 18 toward the expanded portions 46.

The through hole 42 includes a first hole 48 formed on one end side of the joint coupling holder 18 and into which a cylindrical member 38 of the sensor holder 32 is inserted, a second hole 50 adjacent to the first hole 48 and expanded in diameter with respect to the first hole 48, and a third hole 52 formed on another end side of the joint coupling holder 18 and which is expanded in diameter greater than the second hole 50.

Further, a first stepped portion 54 is formed at the boundary position between the first hole 48 and the second hole 50, whereas a second stepped portion 56 is formed at the boundary position between the second hole 50 and the third hole 52. The first and second stepped portions 54, 56 are formed in planar shapes substantially perpendicular to the axis of the through hole 42.

Figure 3:
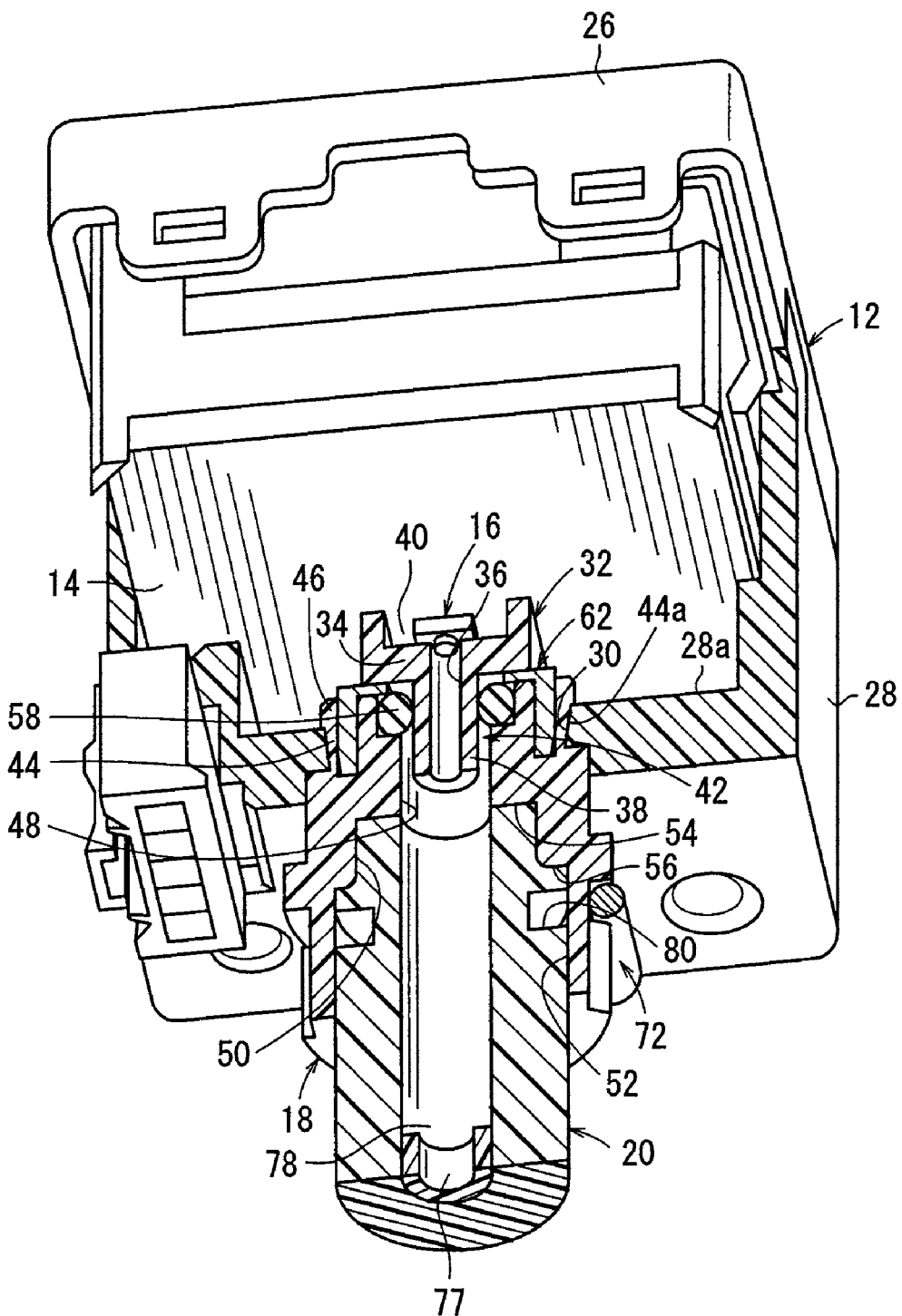
FIG. 3 is a perspective view, partially in cross section, of the pressure switch of FIG. 1, as viewed from a different direction.

In addition, when the joint coupling 20 is inserted into the second and third holes 50, 52 that constitute the through hole 42, a portion of the joint coupling 20 engages through abutment with the first and second stepped portions 54, 56 (see FIG. 3).

Furthermore, an o-ring 58 is installed via an annular groove that is formed in the through hole 42 along an inner circumferential surface of the first hole 48, such that when the cylindrical member 38 of the sensor holder 32 is inserted into the through hole 42, the o-ring 58 abuts against an outer circumferential surface of the cylindrical member 38. Accordingly, outward leaking of the pressure fluid from between the through hole 42 in the joint coupling holder 18 and the cylindrical member 38 of the sensor holder 32 is prevented, and an airtight condition inside the joint coupling holder 18 is maintained.

Figure 4:
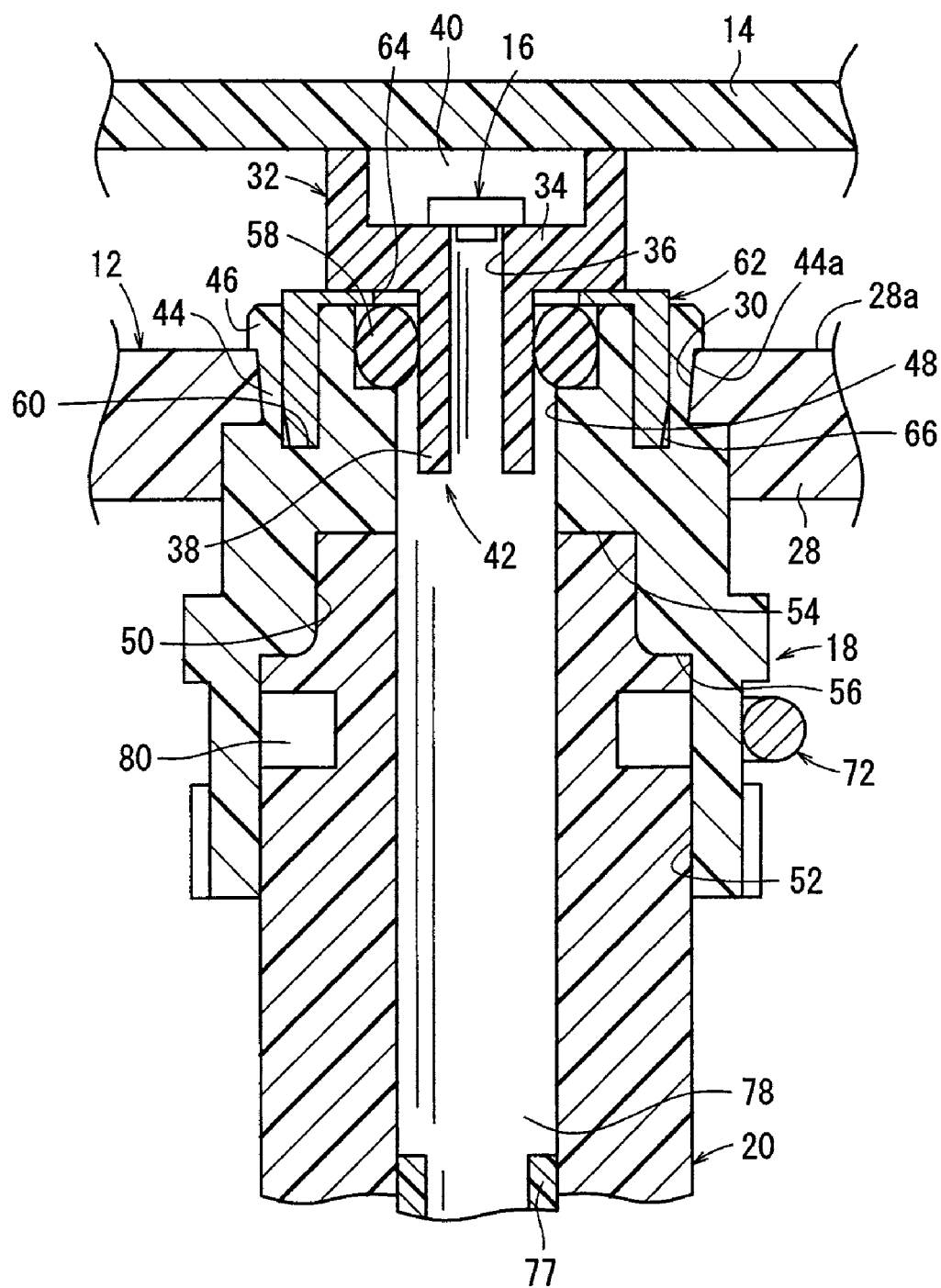
FIG. 4 is an enlarged vertical cross sectional view showing the vicinity of a joint coupling holder, in the pressure switch illustrated in FIG. 2.
Figure 5:
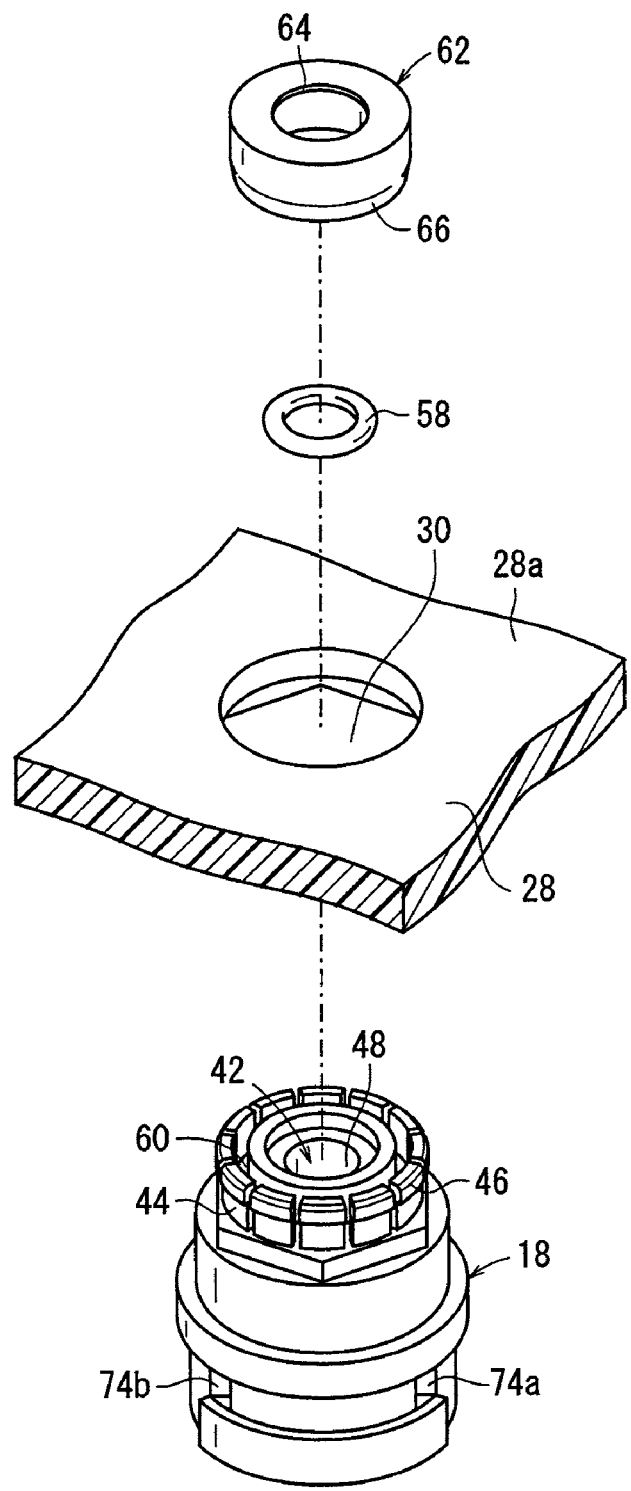
FIG. 5 is a partial exploded perspective view in which the joint coupling holder, a cap and an o-ring of the pressure switch of FIG. 2 are viewed from another direction.

As shown in FIGS. 4 and 5, an annular recess (mounting groove) 60 is disposed between the through hole 42 and the engagement pawls 44 at one end of the joint coupling holder 18, and a cap (stopper) 62, which is substantially U-shaped in cross section, is inserted into the recess 60. Inside the recess 60, the cap 62 abuts against an inner circumferential surface of the engagement pawls 44, thereby regulating displacement of the engagement pawls 44 in a radially inward direction.

The cap 62 is formed with a hole 64 substantially centrally therein, and the cylindrical member 38 of the sensor holder 32 is inserted through the hole 64 when the joint coupling holder 18 is installed. Specifically, the cylindrical member 38 is inserted into the through hole 42 of the joint coupling holder 18 by way of the hole 64 of the cap 62.

Further, the cap 62 is formed in a cylindrical shape, having a tapered surface 66 formed on an outer circumferential surface thereof, which gradually reduces in diameter toward the end of the cap 62. In addition, the cap 62 is inserted with respect to the recess 60 from the tapered surface 66 portion thereof. In particular, the engagement pawls 44 of the joint coupling holder 18 are pressed in a radially outward direction gradually by the tapered surface 66 of the cap 62, thereby securing the joint coupling holder 18 such that the engagement pawls 44 is maintained in a substantially parallel condition with respect to the axis of the joint coupling holder 18, by the outer circumferential surface of the cap 62.

Stated otherwise, the cap 62 functions as a stopper, which regulates radially inward displacement of the engagement pawls 44 making up the joint coupling holder 18.

Moreover, since the cap 62 covers a portion of the through hole 42, disengagement of the o-ring 58 that has been installed in the through hole 42 is suitably prevented (see FIG. 4).

On the other hand, a pair of pin holes 74a, 74b are formed on the outer circumferential surface of the joint coupling holder 18. The pin holes 74a, 74b are formed along a straight line at substantially symmetric positions about the axis of the joint coupling holder 18. A connecting pin 72 is inserted into the pin holes 74a, 74b for connecting the joint coupling 20 to the joint coupling holder 18.

The connecting pin 72 is formed substantially in a U-shape, and is inserted into one of the pin holes 74a from a side of the ends of a pair of pin members 76 that are separated by a predetermined distance, the pin members 76 passing through the interior of the joint coupling holder 18, and being inserted through the other pin hole 74b.

The joint coupling 20 is made up of a cylindrical body formed with a predetermined length along the axial direction, one end of the joint coupling 20 being connected by the connecting pin 72 to the other end of the joint coupling holder 18. Piping 77 through which a fluid flows is detachably connected to the other end of the joint coupling 20. The joint coupling 20 is not limited to being formed with a straight shape, arranged along a straight line from one end to the other end thereof. For example, it also is acceptable for the joint coupling 20 to have a bent elbow shape, with a substantially L-shaped cross section.

A conduit 78 through which the pressure fluid flows via the piping 77 is formed at the interior of the joint coupling 20, such that when the joint coupling 20 is connected to the joint coupling holder 18, the conduit 78 at the other end of the joint coupling 20 and the through hole 42 are arranged on a straight line and communicate mutually with one another.

Further, an annular shaped pin groove 80 is formed at a position symmetrical with respect to the axis of the joint coupling 20 on the outer circumferential surface of the joint coupling 20, such that the pin members 76 of the connecting pin 72 are inserted respectively into the pin groove 80. Specifically, one end of the joint coupling 20 is inserted into the through hole 42 of the joint coupling holder 18, and when the joint coupling 20 is in a state of stopped engagement with the first and second stepped portions 54, 56, the pin members 76 of the connecting pin 72 engage respectively with the pin groove 80 of the joint coupling 20 by insertion of the connecting pin 72 from one of the pin holes 74a in the joint coupling holder 18. As a result, the relative positioning of the joint coupling 20 and the joint coupling holder 18 along the axial direction is regulated by the connecting pin 72, and the joint coupling 20 is connected together with the joint coupling holder 18.

The pressure switch according to the embodiment of the present invention is basically constructed as described above. Next, a brief explanation shall be given concerning a method of assembling the pressure switch 10. In the following description, it shall be understood that the display 22, the operating buttons 24, and the control substrate 14, etc., are already in an assembled state on the cover 26 that makes up one element of the housing 12.

Figure 6A:
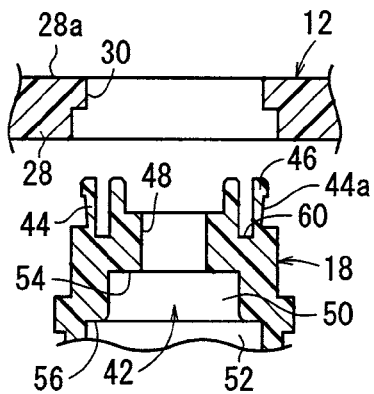
FIG. 6A, FIG. 6B, FIG. 6C and FIG. 6D are respective enlarged vertical cross sectional views, illustrating the assembly steps employed when the joint coupling holder is assembled with respect to the housing.
Figure 6B:
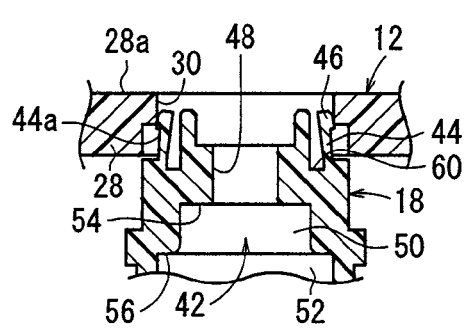
Figure 6C:
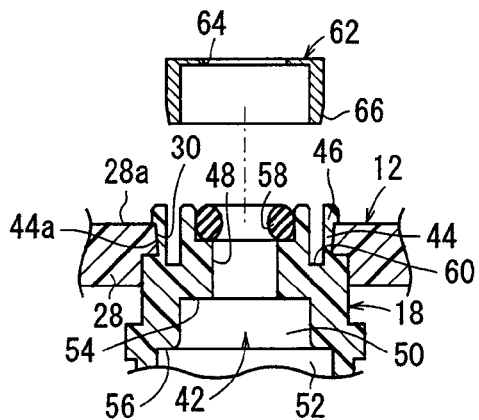

First, one end of the joint coupling holder 18 is inserted into the opening 30 of the case 28 that makes up the housing 12 shown in FIG. 6A (see FIG. 6B), whereupon the engagement pawls 44 project through the opening 30 toward the inside from the bottom 28a of the case 28 (see FIG. 6C). At this time, the engagement pawls 44 are at first pressed radially inward and reduced in diameter by the inner wall surface of the opening 30 (see FIG. 6B), and thereafter, are slightly expanded radially outward in diameter again, due to the expanded portions 46 projecting with respect to the bottom 28a of the case 28.

Figure 6D:
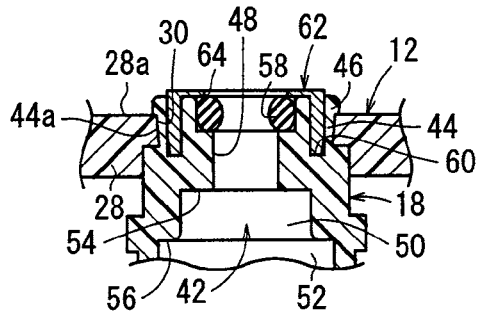

In addition, together with installing the o-ring 58 in the through hole 42 of the joint coupling holder 18, by inserting the cap 62 into the recess 60 of the joint coupling holder 18 from the side of the case 28, the engagement pawls 44 are pressed in a radial outward direction and displacement thereof in the radial inward direction is regulated (see FIG. 6D). As a result, the expanded portions 46 of the engagement pawls 44 engage with the bottom 28a of the case 28, and the joint coupling holder 18 is connected with respect to the case 28 (see FIG. 4).

Further, at the same time, because the outer peripheral surface 44a of the engagement pawls 44 is formed with a tapered shape, the engagement pawls 44 are tilted and fitted into engagement by being pressed radially outwardly with the cap 62, so that the outer peripheral surface 44a of the engagement pawls 44 deforms the inner circumferential surface of the opening 30.

More specifically, since radial inward displacement of the engagement pawls 44 is regulated, in a state in which the expanded portions 46 are engaged with the bottom 28a of the case 28, the engagement pawls 44 do not move toward the interior of the opening 30 and are firmly fixed with respect to the case 28. Together therewith, because the outer peripheral surface 44a of the engagement pawls 44 is fitted into engagement with respect to the opening 30, rotational displacement of the joint coupling holder 18 including the engagement pawls 44 also is regulated.

Next, the control substrate 14, on which the sensor holder 32 including the detector 16 is mounted, is installed in the case 28 from above, together with attachment of the cover 26 (see FIG. 4). Accordingly, the control substrate 14 and the sensor holder 32 are accommodated inside the case 28, and the open end of the case 28 is closed by the cover 26 (see FIG. 3). Further, the cylindrical member 38 of the sensor holder 32 is inserted into the first hole 48 of the joint coupling holder 18, whereupon the outer circumferential surface of the cylindrical member 38 is surrounded and enclosed by the o-ring 58. Owing thereto, an airtight condition between the sensor holder 32 and the joint coupling holder 18 is maintained reliably.

Lastly, one end of the joint coupling 20 is inserted into the through hole 42 of the joint coupling holder 18, whereupon the joint coupling 20 is positioned by abutment against the first and second stepped portions 54, 56. Along therewith, by inserting the connecting pin 72 from one of the pin holes 74a in the joint coupling holder 18, and by continued insertion thereof through the other of the pin holes 74b, the pin members 76 are inserted through the pin groove 80 of the joint coupling 20, which has been inserted inside of the joint coupling holder 18, and accordingly, the joint coupling holder 18 and the joint coupling 20 are connected together.

Next, operations and effects of the pressure switch 10, which has been assembled in the foregoing manner, shall be explained.

A pressure fluid is supplied to the piping 77 from an unillustrated pressure fluid supply source (for example, a compressor), whereupon the pressure fluid flows through the piping 77 and into the conduit 78 inside the joint coupling 20. In addition, the pressure fluid, which flows from the conduit 78 and into the through hole 42 of the joint coupling holder 18, passes through the passage 36 of the sensor holder 32 and is introduced into the space 40. Accordingly, the pressure of the pressure fluid is imposed with respect to the detector 16 that is accommodated in the space 40. A resistance value, which is changed by the pressure, is output to the control substrate 14, whereby the pressure of the pressure fluid is calculated based on the change in the resistance value. The pressure value of the pressure fluid is output to the display 22 from the control substrate 14 and displayed, and together therewith, an output signal based on the pressure value may be output to an external device.

In the foregoing manner, in the present embodiment, the cylindrically shaped joint coupling holder 18 is made from a resin material, whereby the joint coupling 20 is connectable to the housing 12 through the joint coupling holder 18. A plurality of engagement pawls 44 having expanded portions 46 which expand in a radially outward direction are tiltably disposed on one end of the joint coupling holder 18. The engagement pawls 44 engage with the bottom 28a of the case 28 by means of inserting the one end into the opening 30 of the housing 12. In addition, by insertion of the cap 62 into a recess 60 of the joint coupling holder 18, which is formed on an inner circumferential side of the engagement pawls 44, radial inward displacement of the engagement pawls 44 is regulated, and the engaged condition of the joint coupling holder 18 with respect to the housing 12 by the engagement pawls 44 can be maintained.

In this manner, by utilizing the joint coupling holder 18, which is made of a resin material, and by mounting the cap 62 therein, in a state in which the engagement pawls 44 are in engagement with the opening 30 of the housing 12, the joint coupling holder 18 can be easily and reliably connected with respect to the housing 12, which also is formed of a resin material. As a result, compared with the conventional pressure switch in which a metallic joint coupling is fixed by caulking to the main body, manufacturing costs can be reduced along with shortening the manufacturing time, since it is unnecessary to perform any caulking or crimping process with respect to the joint coupling.

Further, the connection can be performed reliably by a simple operation, whereby one end of the joint coupling holder 18 is inserted into the opening 30 of the housing 12, and the cap 62 is inserted into the recess 60 in a state in which plural engagement pawls 44 are engaged with the bottom 28a of the housing 12, and further the joint coupling holder 18, which is made of a resin material, can be directly connected with respect to the housing 12. Owing thereto, it becomes unnecessary to provide a metal washer to increase the strength of the connected portion as in the conventional pressure switch, the number of parts can be reduced, and assembly variances can be suppressed.

Furthermore, by forming the joint coupling holder 18 from a resin material, component costs can be reduced compared to the conventional pressure switch.

Still further, because the cap 62 is installed such that it covers one end of the joint coupling holder 18, the o-ring 58 that is installed in the through hole 42 of the joint coupling holder 18 can be prevented from falling out.

The pressure switch according to the present invention is not limited to the above-described embodiment, and various other structures may be adopted as a matter of course, which to not deviate from the essential features and gist of the present invention.

What is claimed is:

1. A pressure switch having a detector therein for detecting a pressure of a pressure fluid, and outputting an output signal on the basis of a pressure value detected by said detector, the pressure switch comprising:
    a housing made of a resin material and accommodating said detector therein;
    a joint coupling having a passage therein through which said pressure fluid flows, and which is connected to piping through which said pressure fluid is supplied;
    a connecting member made of a resin material, which connects said housing and said joint coupling; and
    a connecting mechanism for connecting said connecting member with respect to said housing, having one or more pawls, which are formed so as to be tiltable in a radial direction on an end of said connecting member and which engage with an opening of said housing, and a stopper that regulates radial inward displacement of said pawls,
    wherein said stopper is formed in a cylindrical shape, and said connecting member is held with respect to said housing through said pawls, as a result of regulating the displacement of said pawls, which are engaged with said opening, by said stopper.

2. The pressure switch according to claim 1, wherein said one or more pawls comprise a plurality of pawls separated a predetermined distance from each other in a circumferential direction on said end of said connecting member, and wherein an installation groove, into which said stopper is installed, is formed on an inner circumferential side of said pawls thereby.

3. The pressure switch according to claim 2, wherein an outer peripheral surface of said plurality of pawls is formed with a tapered shape, which gradually reduces in diameter toward an end side to which said joint coupling is connected.

4. The pressure switch according to claim 3, wherein expanded portions, which bulge in a radial outward direction, are provided on ends of said pawls, said expanded portions latching onto a side surface of said housing.

5. The pressure switch according to claim 4, wherein said pawls are pressed by said stopper in a radially outward direction toward an inner circumferential surface of said opening, and thereby are fitted with respect to said opening.

6. The pressure switch according to claim 5, wherein said opening is formed with a tapered shape that gradually reduces in diameter toward a side of said joint coupling, and wherein an outer peripheral surface of said plurality of pawls abuts against an inner circumferential surface of said opening.

7. The pressure switch according to claim 6, wherein said pawls are sandwiched and gripped between said stopper and said opening in a radial direction.

8. The pressure switch according to claim 1, wherein said detector is disposed on a substrate facing said passage.

9. The pressure switch according to claim 1, wherein an annular pin groove is formed along an outer circumferential surface on said joint coupling, and a pair of pin holes, through which a connecting pin is inserted, is formed on said connecting member, whereby said joint coupling and said connecting member are connected with each other through engagement of said connecting pin that is inserted through said pin holes with said pin groove.

10. The pressure switch according to claim 1, wherein an outer circumferential surface of said stopper includes a tapered surface, which gradually reduces in diameter toward an end of said stopper.

* * * * *